United States Patent
Watanabe (10) Patent No.: US 10,630,865 B2
(45) Date of Patent: Apr. 21, 2020

(54) IMAGE FORMING APPARATUS INCORPORATING CONTROL CIRCUITRY FOR EXECUTING CONTROL METHOD TO ARBITRATE ACCESS BETWEEN SIGNALS REFERRING PRIORITY SETTINGS

(71) Applicant: Yuuto Watanabe, Kanagawa (JP)

(72) Inventor: Yuuto Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/390,392

(22) Filed: Apr. 22, 2019

(65) Prior Publication Data

US 2019/0387124 A1    Dec. 19, 2019

(30) Foreign Application Priority Data

Jun. 18, 2018    (JP) .................. 2018-115373

(51) Int. Cl.
| | |
|---|---|
| G06F 13/26 | (2006.01) |
| H04N 1/32 | (2006.01) |
| G06F 13/42 | (2006.01) |
| H04N 1/00 | (2006.01) |
| G06F 3/12 | (2006.01) |

(52) U.S. Cl.
CPC ......... *H04N 1/32587* (2013.01); *G06F 13/26* (2013.01); *G06F 13/4282* (2013.01); *H04N 1/00854* (2013.01); *H04N 1/00856* (2013.01); *H04N 1/00915* (2013.01); *H04N 1/32577* (2013.01); *H04N 1/32582* (2013.01); *G06F 3/1297* (2013.01); *G06F 2213/0026* (2013.01); *H04N 1/00108* (2013.01)

(58) Field of Classification Search
None
See application file for complete search history.

(56) References Cited

U.S. PATENT DOCUMENTS

| | | | | |
|---|---|---|---|---|
| 5,058,055 A | * | 10/1991 | Takemoto | G06K 15/00 358/1.15 |
| 2003/0227637 A1 | | 12/2003 | Tanaka | |
| 2005/0052679 A1 | * | 3/2005 | Green | G06F 3/1203 358/1.14 |
| 2007/0297005 A1 | * | 12/2007 | Montierth | B41J 3/36 358/1.15 |
| 2017/0187916 A1 | | 6/2017 | Ohta et al. | |
| 2017/0187917 A1 | | 6/2017 | Tanaka et al. | |
| 2017/0195518 A1 | | 7/2017 | Watanabe et al. | |

FOREIGN PATENT DOCUMENTS

| | | |
|---|---|---|
| JP | 2003-333232 | 11/2003 |
| JP | 2014-146278 | 8/2014 |

* cited by examiner

*Primary Examiner* — Benny Q Tieu
*Assistant Examiner* — Haris Sabah
(74) *Attorney, Agent, or Firm* — IPUSA, PLLC (57) ABSTRACT

Control circuitry includes a converter and an arbitration unit. The converter is configured to convert a first signal based on a first communication standard to an internal second signal based on a second communication standard and output the internal second signal. The arbitration unit is configured to arbitrate between access of the internal second signal output from the converter and access of an external second signal, which is also based on the second communication standard, input from outside the control circuitry.

10 Claims, 10 Drawing Sheets

IMAGE FORMING APPARATUS
INCORPORATING CONTROL CIRCUITRY
FOR EXECUTING CONTROL METHOD TO
ARBITRATE ACCESS BETWEEN SIGNALS
REFERRING PRIORITY SETTINGS

CROSS-REFERENCE TO RELATED
APPLICATION

This patent application is based on and claims priority pursuant to 35 U.S.C. § 119(a) to Japanese Patent Application No. 2018-115373, filed on Jun. 18, 2018, in the Japan Patent Office, the entire disclosure of which is hereby incorporated by reference herein.

BACKGROUND

Technical Field

Embodiments of the present disclosure relate to control circuitry, an image forming apparatus incorporating the control circuitry, a control method, and a non-transitory recording medium storing a program for executing the control method.

Description of the Related Art

Certain image forming apparatuses include circuitry such as an application specific integrated circuit (ASIC), a field-programmable gate array (FPGA), or the like. Image processing with such circuitry is known to improve image quality. In such image forming apparatuses, this circuitry is connected to a central processing unit (CPU) via a serial interface or the like, and image data is processed and transferred with a certain proficiency.

SUMMARY

Embodiments of the present disclosure describe improved control circuitry that includes a converter and an arbitration unit. The converter is configured to convert a first signal based on a first communication standard into an internal second signal based on a second communication standard and output the internal second signal. The arbitration unit is configured to arbitrate between access of the internal second signal output from the converter and access of an external second signal, which is also based on the second communication standard, input from outside the control circuitry.

BRIEF DESCRIPTION OF THE SEVERAL
VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

Figure 1:
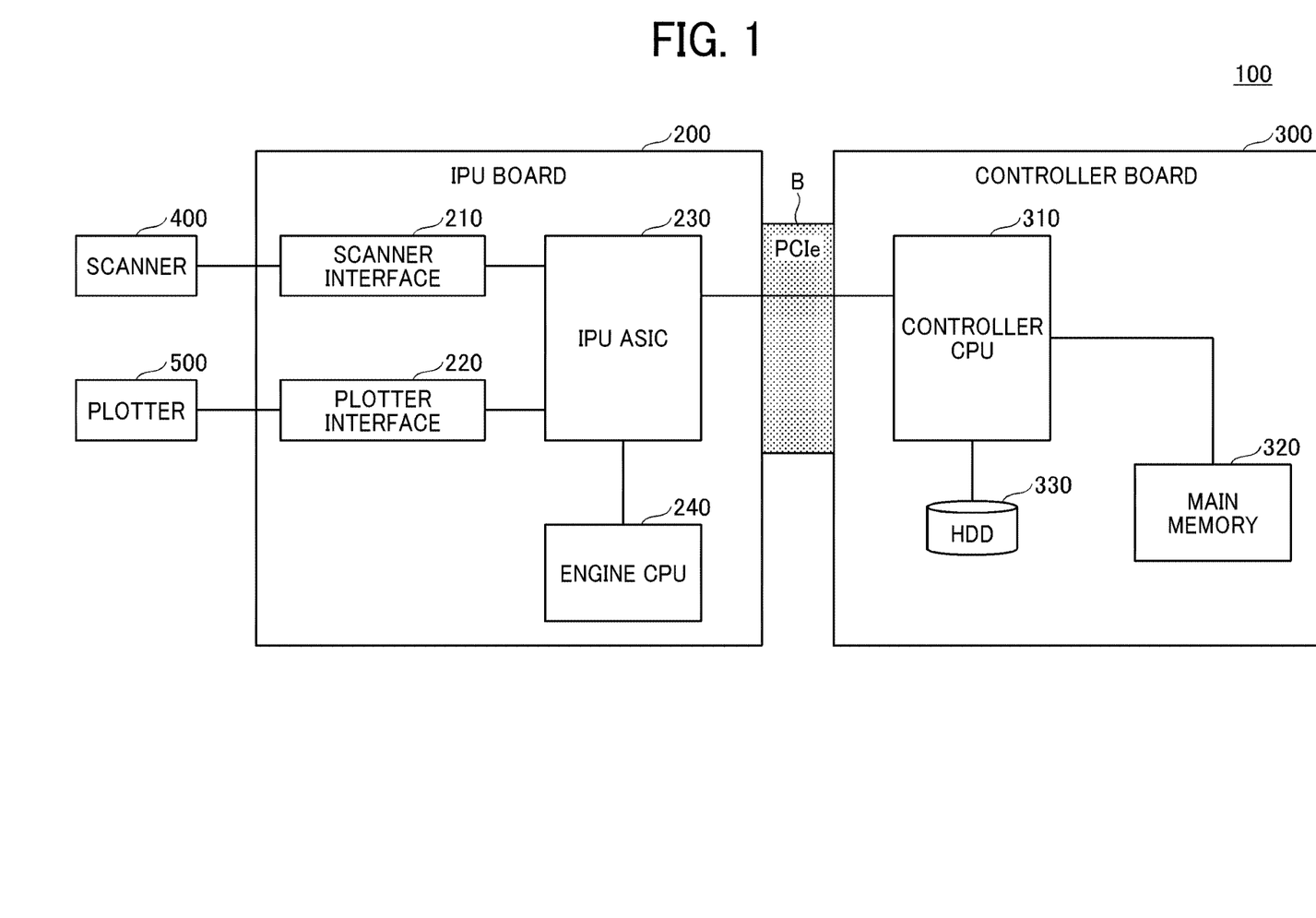
FIG. 1 is a block diagram illustrating an image forming apparatus according to a first embodiment of the present disclosure.

Descriptions are given of a first embodiment of the present disclosure with reference to the drawings. FIG. 1 is a block diagram of an image forming apparatus 100 according to the first embodiment. FIG. 1 schematically illustrates a configuration of the image forming apparatus 100.

The image forming apparatus 100 according to the present embodiment includes an image processing unit (IPU) board 200, a controller board 300, a scanner 400, and a plotter 500. The IPU board 200 and the controller board 300 are connected by a peripheral component interconnect express (PCIe) bus B. In the following description, the PCIe bus B is simply referred to as the bus B.

The IPU board 200 includes a scanner interface 210, a plotter interface 220, an IPU ASIC 230, and an engine CPU 240.

The scanner interface 210 acquires image data read by the scanner 400 and transmits the image data to the IPU ASIC 230. The plotter interface 220 transmits image data transferred from the controller board 300 via the IPU ASIC 230, to the plotter 500. In the following description, the IPU ASIC 230 is simply referred to as the ASIC 230.

The ASIC 230 performs various kinds of image processing on the image data transferred from the scanner interface 210 and the image data transferred from the controller board 300. The ASIC 230 transfers the image data on which image processing has been performed to the controller board 300 or the plotter interface 220.

The ASIC 230 according to the present embodiment receives a signal input from the controller board 300 via the bus B and performs an operation according to the signal. In other words, the ASIC 230 is connected to a controller CPU 310 of the controller board 300 based on a PCI express standard (a standard related to first connection or a first communication standard) and receives the signal based on the PCI express standard from the controller board 300. In the present embodiment, the first connection is a connection between an ASIC mounted on one board (i.e., the IPU board) and a CPU mounted on another board (i.e., the controller board).

The ASIC 230 is directly connected to the engine CPU 240 on the IPU board 200 and receives a signal input from the engine CPU 240. In other words, the ASIC 230 is connected to the engine CPU 240 based on a standard (a standard related to second connection or a second communication standard) determined between the ASIC 230 and the engine CPU 240 directly connected to the ASIC 230 and receives the signal based on the standard from the engine CPU 240. In the present embodiment, the second connection is a connection between an ASIC and a CPU mounted on the same board (i.e., the IPU board).

The ASIC 230 according to the present embodiment converts the signal input from the controller board 300 into a signal based on the standard determined between the ASIC 230 and the engine CPU 240 directly connected to the ASIC 230 and performs processing based on the converted signal.

Furthermore, the ASIC 230 according to the present embodiment arbitrates between access from the engine CPU 240 and access from the controller CPU 310. The engine CPU 240 controls an engine unit including the scanner 400 and the plotter 500 via the ASIC 230.

A detailed description of the ASIC 230 is deferred.

Figure 2:
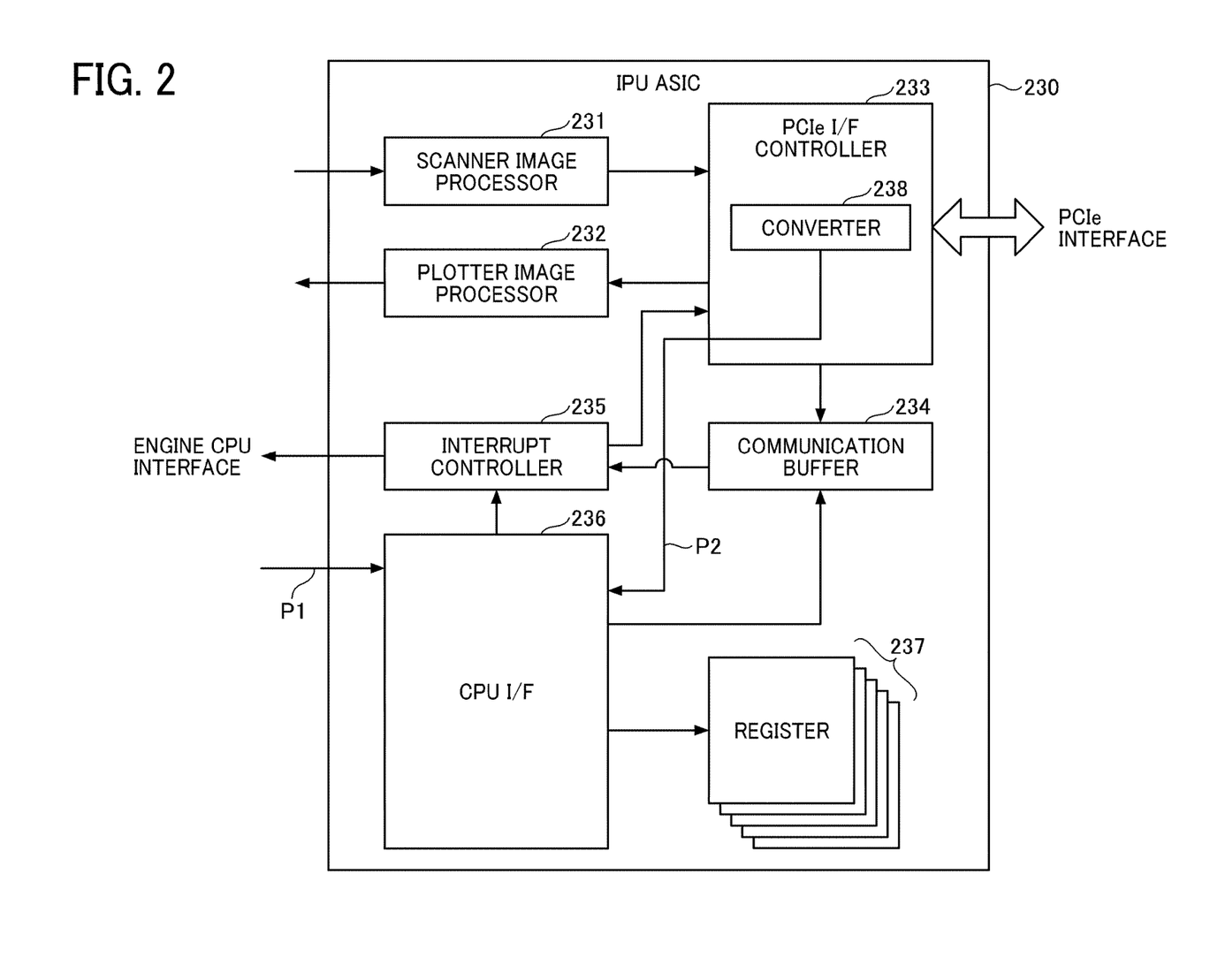
FIG. 2 is a block diagram illustrating a configuration of an ASIC according to the first embodiment.
Figure 3:
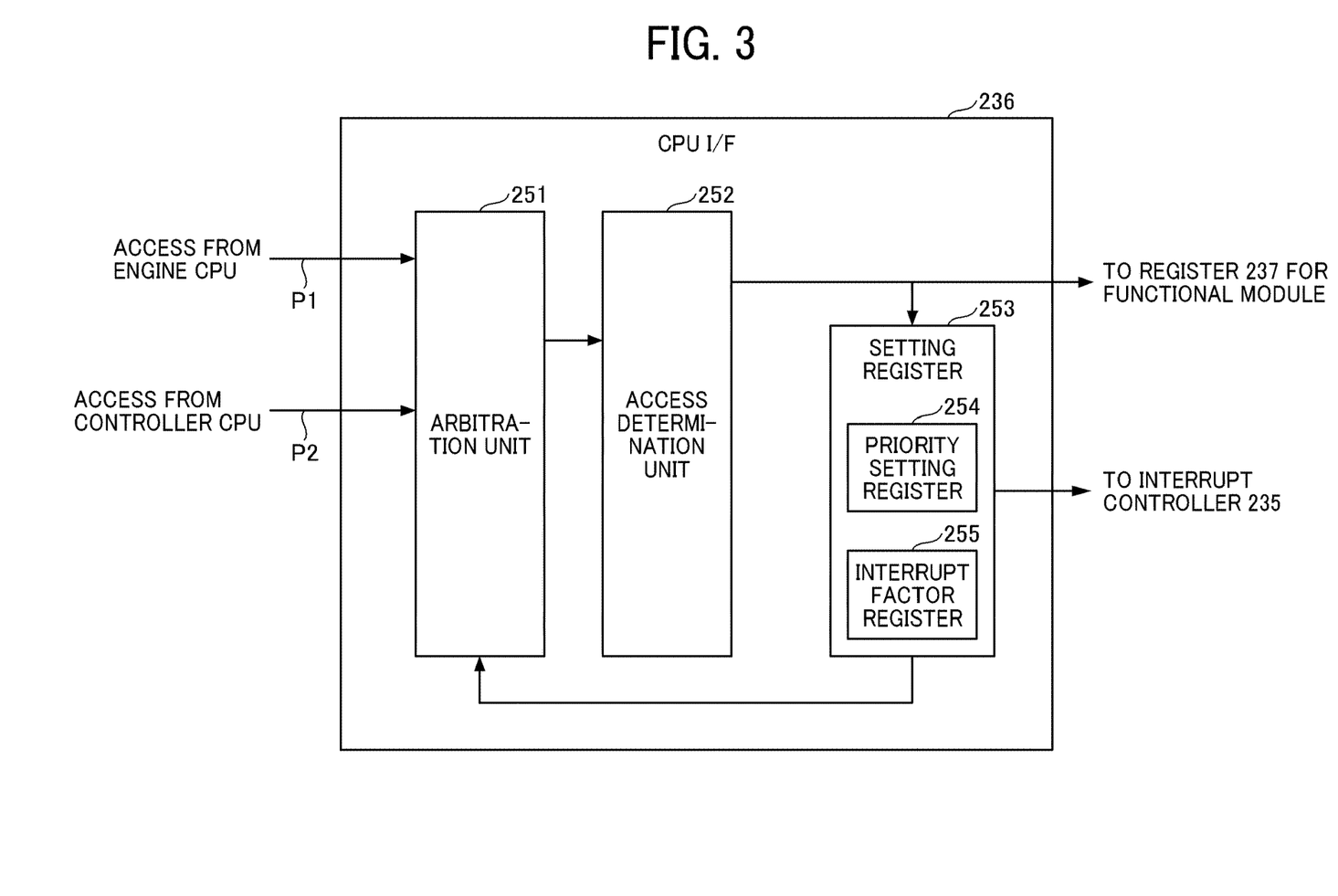
FIG. 3 is a block diagram illustrating a configuration of a CPU interface (I/F) according to the first embodiment.

That is, the ASIC 230 as control circuitry according to the present embodiment includes a converter 238 and an arbitration unit 251 (see FIGS. 2 and 3). The converter 238 converts a first signal based on the standard related to the first connection (i.e., the first communication standard) into an internal second signal based on the standard related to the second connection (i.e., the second communication standard) and outputs the internal second signal. The arbitration unit 251 arbitrates between the access by the internal second signal output from the converter 238 and the access by an external second signal, which is also based on the second communication standard, input from outside the ASIC 230 as the control circuitry.

The controller board 300 according to the present embodiment includes the controller CPU 310, a main memory 320, and a hard disk drive (HDD) 330.

The controller CPU 310 controls operations of the image forming apparatus 100. Further, the controller CPU 310 causes the ASIC 230 to perform various processing.

The main memory 320 is a storage device that stores image data acquired by the controller CPU 310. The HDD 330 accumulates the image data and the like input to the image forming apparatus 100.

A description is now given of operations of the image forming apparatus 100.

In the image forming apparatus 100 according to the present embodiment, the controller CPU 310 performs a configuration of the PCIe via the ASIC 230 and establishes a connection (a link) between the controller CPU 310 and the ASIC 230.

In the image forming apparatus 100, as the scanner 400 reads image data, the acquired image data is input to the ASIC 230 via the scanner interface 210.

As the image data is input to the ASIC 230, the engine CPU 240 controls the ASIC 230 to perform image processing on the image data and transfer the image data. The image data on which the image processing has been performed in the ASIC 230 is transferred to the controller CPU 310 and stored in the main memory 320 via the controller CPU 310.

In the image forming apparatus 100, when an image is output from the plotter 500, the controller CPU 310 reads the image data from the main memory 320 and transfers the image data to the ASIC 230. At that time, the ASIC 230 reads the image data under the control of the engine CPU 240 and outputs the image data to the plotter interface 220 as the subsequent stage.

As described above, the ASIC 230 according to the present embodiment is controlled by both the engine CPU 240 and the controller CPU 310 at the time of reading the image data by the scanner 400 and outputting the image by the plotter 500.

That is, the ASIC 230 according to the present embodiment can also be controlled by CPUs other than the CPU mounted on the same board as the ASIC 230. Accordingly, versatility of the ASIC 230 can be improved.

The ASIC 230 according to the present embodiment is described below with reference to FIG. 2. FIG. 2 is a block diagram illustrating a configuration of the ASIC 230 according to the first embodiment.

The ASIC 230 according to the present embodiment includes a scanner image processor 231, a plotter image processor 232, a PCIe I/F controller 233, a communication buffer 234, an interrupt controller 235, a CPU interface (I/F) 236, and a register 237.

The scanner image processor 231 performs image processing on the image data input from the scanner interface 210. Specifically, the scanner image processor 231 performs image processing of, for example, eliminating noise on the image, correcting magnification error caused by lens characteristics of the scanner optical system, correcting data between lines, correcting density unevenness, correcting skew at the time of scanner reading, filtering, scaling, and the like.

The plotter image processor 232 performs image processing on the image data output from the PCIe I/F controller 233 and outputs the image data to the plotter interface 220. Specifically, the plotter image processor 232 performs image processing such as resolution conversion, gradation processing, area expansion/contraction, ground pattern creation, and the like.

Receiving a signal from the controller CPU 310, the PCIe I/F controller 233 allocates an appropriate access destination from an address and control signal indicated by the signal. In the following description, the PCIe I/F controller 233 is referred to as the interface controller 233.

When allocating the signal received from the controller CPU 310 to the address, the interface controller 233 determines if the signal represents unauthorized access. In other words, the interface controller 233 determines if the signal input from the controller CPU 310 is an unauthorized input. When determining that the access is unauthorized, the interface controller 233 notifies the controller CPU 310, which is an output source of the signal, of an error.

The interface controller 233 controls interrupt via the bus B. The interrupt output from the interface controller 233 via the bus B may be notified to the controller CPU 310 as a packet, similarly to data transfer and the like.

Further, the interface controller 233 according to the present embodiment includes the converter 238.

When the address indicated by the signal received from the controller CPU 310 indicates an area of the register 237 of the ASIC 230, the converter 238 converts the signal into a signal based on the standard determined between the engine CPU 240 and the ASIC 230.

That is, from the controller CPU 310, the converter 238 receives the signal based on the standard, which is related to connection, determined between the controller CPU 310 and the ASIC 230, and converts the signal into the signal based on the standard determined between the engine CPU 240 and the ASIC 230. In other words, the converter 238 converts the first signal based on the standard related to the first connection into the internal second signal based on the standard related to the second connection. The controller CPU 310 that outputs the first signal is a first CPU, and the engine CPU 240 that outputs the external second signal is a second CPU. The internal second signal is a signal from the converter 238 inside the ASIC 230, and the external second signal is a signal input from the engine CPU 240 (i.e., from outside the ASIC 230).

The communication buffer 234 is used to transmit data received from the engine CPU 240 and the controller CPU 310 to each other.

The interrupt controller 235 accepts access from the engine CPU 240 or the controller CPU 310, and generates and outputs a corresponding interrupt signal. In the following descriptions, the expression "receiving a signal input from the CPU" has the same meaning as the expression "accepting access from the CPU".

The CPU interface 236 receives a signal from each of the engine CPU 240 and the interface controller 233. In other words, the CPU interface 236 includes a path P1 to accept the access from the engine CPU 240 and a path P2 to accept the access from the controller CPU 310 via the interface controller 233.

The CPU interface 236 according to the present embodiment arbitrates access from the path P1 and the path P2. The CPU interface 236 is described in detail later.

The ASIC 230 includes the register 237 that is used when various processing according to control from the engine CPU 240 or the controller CPU 310 is performed.

Next, with reference to FIG. 3, the CPU interface 236 according to the present embodiment is described. FIG. 3 is a block diagram illustrating a configuration of the CPU interface 236 according to the first embodiment.

The CPU interface 236 according to the present embodiment includes the arbitration unit 251, an access determination unit 252, and a setting register 253.

The arbitration unit 251 arbitrates between the access to the CPU interface 236 from the engine CPU 240 and the access to the CPU interface 236 from the controller CPU 310 via the interface controller 233. In other words, the arbitration unit 251 arbitrates the access from the path P1 and the path P2.

More specifically, the arbitration unit 251 allows the access from the engine CPU 240 or the controller CPU 310 according to priority set in a priority setting register 254 included in the setting register 253.

Referring to an address indicated by the access allowed by the arbitration unit 251, the access determination unit 252 accesses a register in a module indicated by the address.

Specifically, if the allowed access is access to a register in the CPU interface 236, the access determination unit 252 accesses the register in the same module. If the allowed access is access to a register in a peripheral module outside the CPU interface 236, the access determination unit 252 accesses the register in the corresponding module.

The setting register 253 includes the priority setting register 254 and an interrupt factor register 255 to set an arbitration rule. A CPU that is preferentially allowed access is set in the priority setting register 254. Factors that cause the interrupt controller 235 to output an interrupt signal are set in the interrupt factor register 255. The setting register 253 causes the interrupt controller 235 to output the interrupt signal according to the settings of the interrupt factor register 255.

Figure 4:
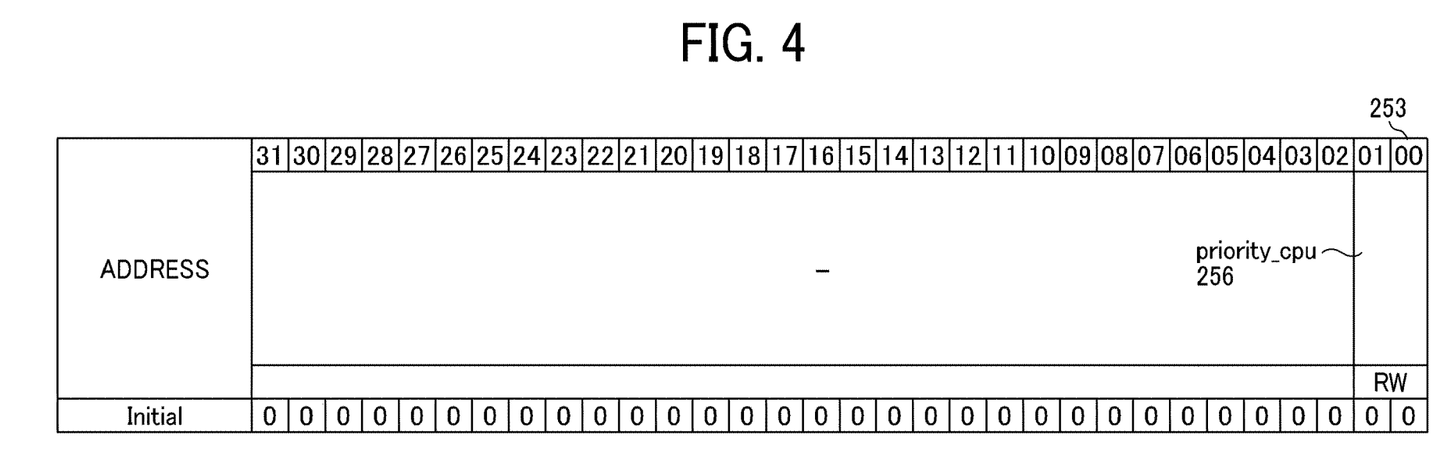
FIG. 4 is a schematic diagram illustrating a data priority setting according to the first embodiment.

Next, with reference to FIG. 4, the data priority setting of the setting register 253 is described. FIG. 4 is a schematic diagram illustrating the data priority setting according to the first embodiment.

In the example in FIG. 4, the setting register 253 includes a two-bit area 256 to set priority between the engine CPU 240 and the controller CPU 310. In FIG. 4, for example, the access from the engine CPU 240 may have priority when a value in the area 256 of the setting register 253 is "00", and the access from the engine CPU 240 and the controller CPU 310 may be alternately allowed when the value in the area 256 of the setting register 253 is "10".

In the FIG. 4, the number of bits of the area 256 is, but not limited to, 2 bits. Alternatively, the number of the bits of the area 256 is extended in the setting register 253, and an arbitration method can be finely specified. Specifically, for example, the arbitration method can be a weighted round robin method.

Next, with reference to FIGS. 5 to 8, operations of the image forming apparatus 100 according to the present embodiment are described.

Figure 5:
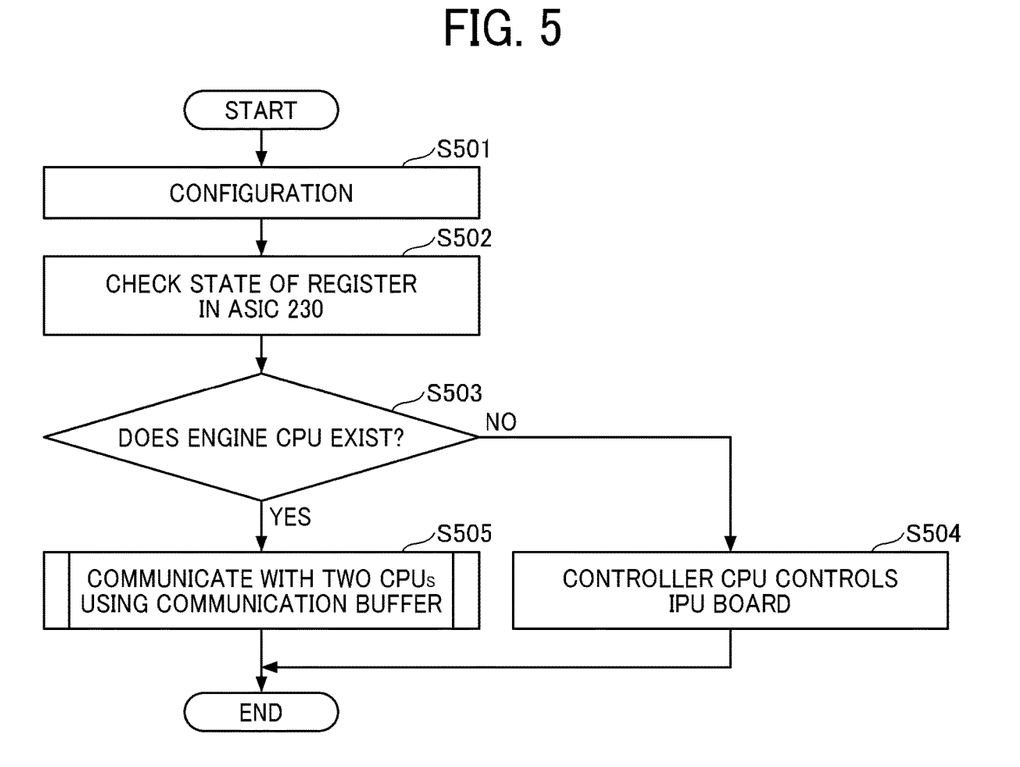
FIG. 5 is a first flowchart illustrating operations of the image forming apparatus according to the first embodiment.

FIG. 5 is a first flowchart illustrating operations of the image forming apparatus 100 according to the first embodiment. FIG. 5 illustrates the operations when communication between the IPU board 200 and the controller board 300 starts in the image forming apparatus 100.

In the image forming apparatus 100 according to the present embodiment, the controller CPU 310 performs a configuration and establishes a connection (a link) between the controller CPU 310 and the ASIC 230 (step S501). Specifically, the controller CPU 310 establishes various settings relating to the connection with the ASIC 230 and may hold the setting file describing the setting contents in a predetermined format.

Subsequently, the controller CPU 310 refers to a state of the register 237 in the ASIC 230 (step S502), and the interface controller 233 determines if the engine CPU 240 is connected to the ASIC 230 (step S503).

In step S503, if the engine CPU does not exist, the image forming apparatus 100 controls operations of the IPU board 200 by the controller CPU 310 (step S504).

In step S503, if the engine CPU 240 exists, the controller CPU 310 communicates with the engine CPU 240 using the communication buffer 234 of the ASIC 230 (step S505). A detailed description of the operation in step S505 is deferred.

In FIG. 5, the image forming apparatus 100 may end step S504 or step S505, for example, when the image forming apparatus 100 stops operating. "When the image forming apparatus 100 stops operating" means, for example, when the image forming apparatus 100 is turned off, when the image forming apparatus 100 enters a standby state, or the like.

Figure 6:
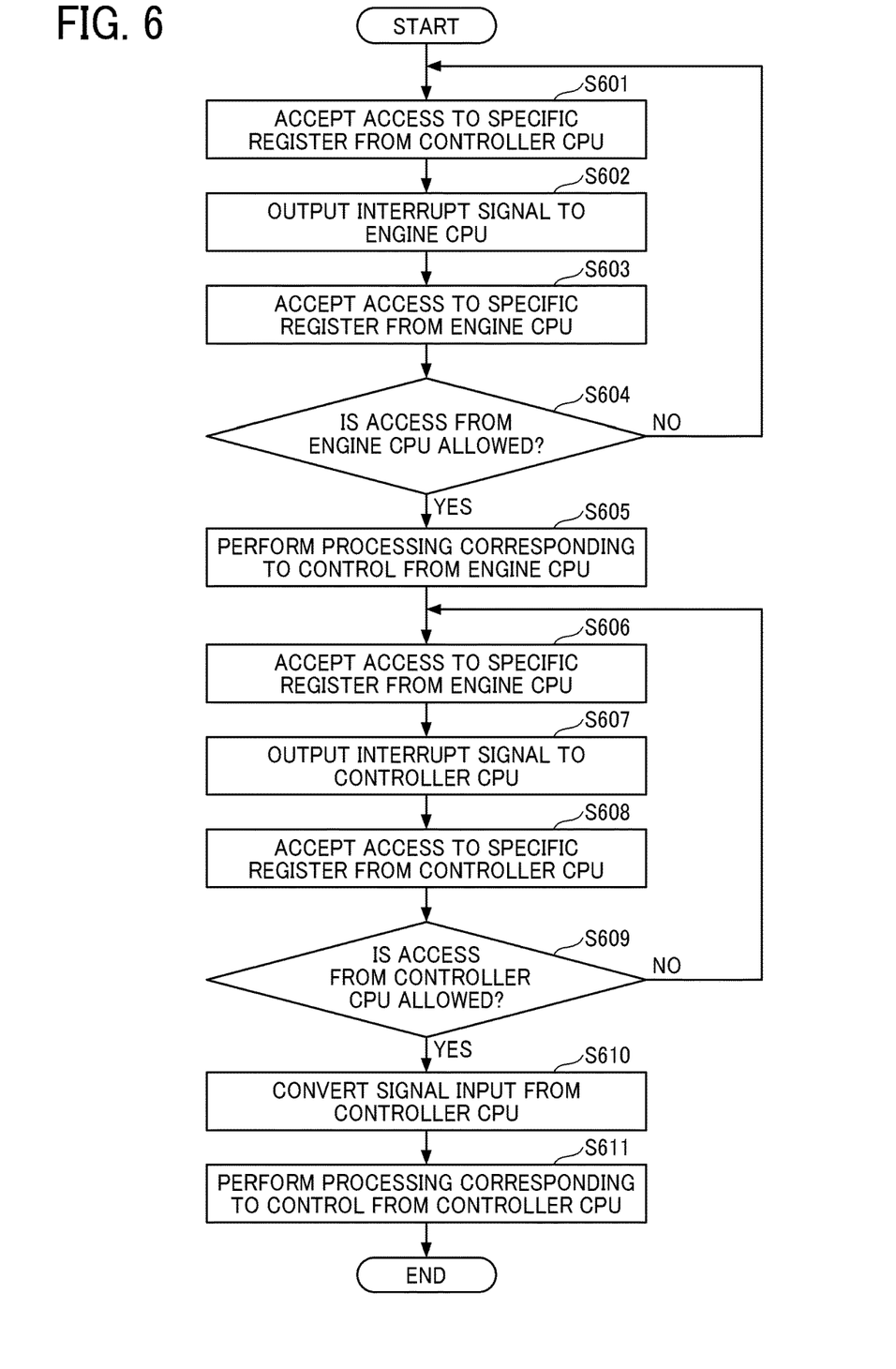
FIG. 6 is a second flowchart illustrating operations of the image forming apparatus according to the first embodiment.
Figure 7:
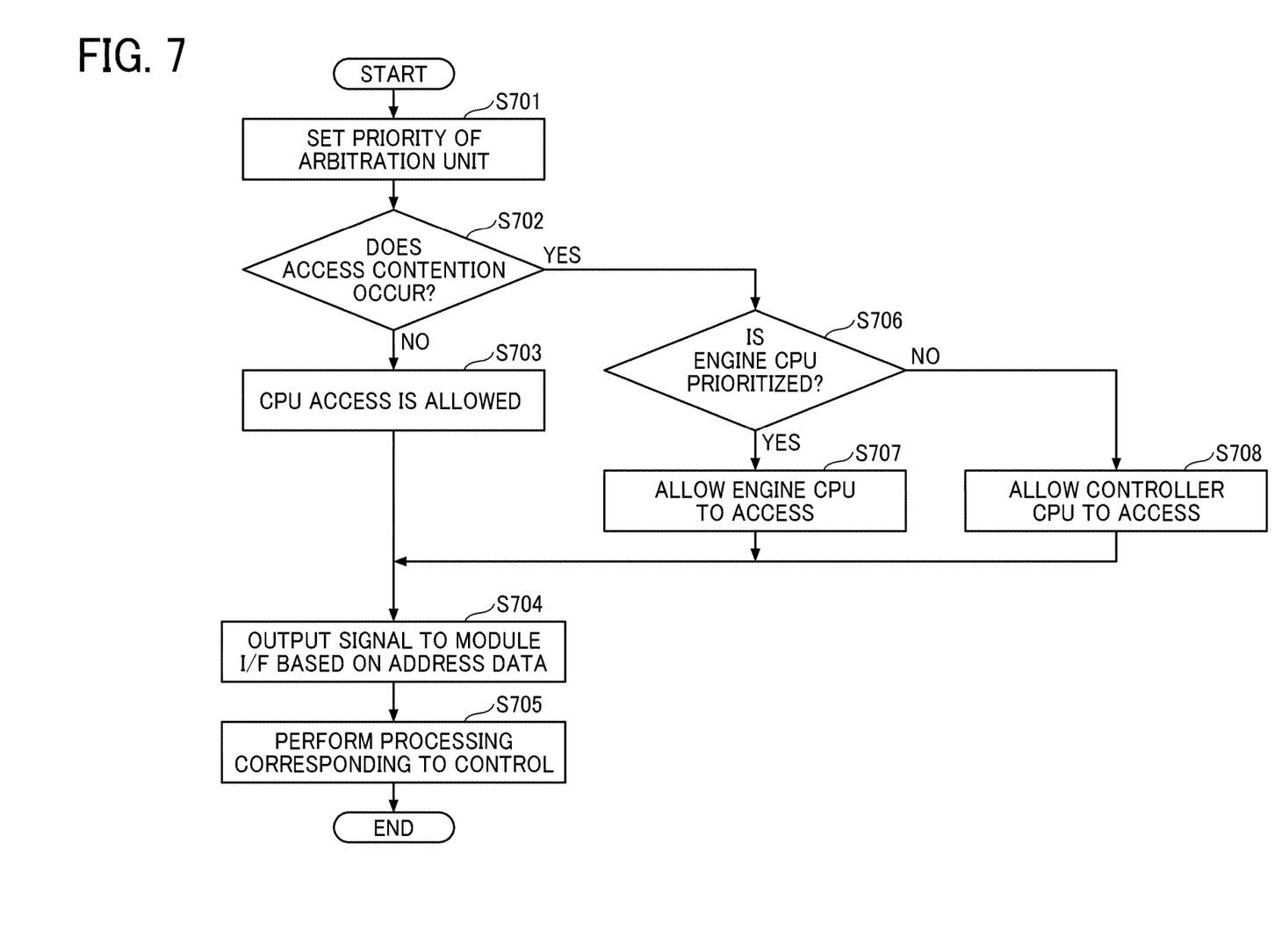
FIG. 7 is a third flowchart illustrating operations of the image forming apparatus according to the first embodiment.

Next, descriptions are given of operations of the ASIC 230 in a case in which the controller CPU 310 and the engine CPU 240 communicate with each other via the ASIC 230 with reference to FIGS. 6 through 7.

Hereinafter, the operations of the ASIC 230 are described in both cases in which the communication buffer 234 is used so that conflicting access between the engine CPU 240 and the controller CPU 310 does not occur, and in which conflicting access between the engine CPU 240 and the controller CPU 310 does occur.

FIG. 6 is a second flowchart illustrating operations of the image forming apparatus 100 according to the first embodiment. FIG. 6 illustrates the operations of the ASIC 230 in step S505 in FIG. 5. Further, FIG. 6 illustrates the operations of the ASIC 230 when conflicting access between the engine CPU 240 and the controller CPU 310 does not occur.

FIG. 6 illustrates processes in which right of access to the ASIC 230 is transferred from the controller CPU 310 to the engine CPU 240 first, and thereafter the right of access is returned to the controller CPU 310.

The ASIC 230 according to the present embodiment accepts access to a specific register of the communication buffer 234 from the controller CPU 310 via the interface controller 233 (step S601). Specifically, the ASIC 230 accepts access from the controller CPU 310 by the interface controller 233 and writes to the specific register of the communication buffer 234.

In the ASIC 230, in response to a writing to the communication buffer 234, the interrupt controller 235 outputs the interrupt signal to the engine CPU 240 (step S602).

Subsequently, the ASIC 230 accepts access to a specific address of the communication buffer 234 from the engine CPU 240 via the CPU interface 236 (step S603). In other words, the engine CPU 240 receives the interrupt signal from the ASIC 230 and accesses the ASIC 230.

Subsequently, the CPU interface 236 determines from a value of the specific address of the communication buffer 234 if the access from the engine CPU 240 is allowed (step S604). In step S604, if the access by the engine CPU 240 is not allowed, the process returns to step S601. At that time, the engine CPU 240 waits until receiving a next interrupt signal.

In step S604, when the access from the engine CPU 240 is allowed, the ASIC 230 performs processing corresponding to control from the engine CPU 240 (step S605). Specifically, the ASIC 230 refers (reads/writes) to the register 237 corresponding to the signal received from the engine CPU 240 by the CPU interface 236 and performs various processing.

Subsequently, the ASIC 230 accepts access to the specific register of the communication buffer 234 from the engine CPU 240 (step S606). Specifically, the ASIC 230 accepts access from the engine CPU 240 by the CPU interface 236 and writes to the specific register of the communication buffer 234. In the communication buffer 234, the register to which the interface controller 233 writes in response to the access of the controller CPU 310 and the register in which the CPU interface 236 writes in response to the access of the engine CPU 240 may be the same register or, alternatively, may be different registers from each other.

Subsequently, in response to the writing to the communication buffer 234, the interrupt controller 235 outputs the interrupt signal to the controller CPU 310 (step S607).

Next, the ASIC 230 accepts access to the specific address of the communication buffer 234 from the controller CPU 310 via the interface controller 233 (step S608). In other words, the controller CPU 310 receives the interrupt signal from the ASIC 230 and accesses the ASIC 230.

Subsequently, the interface controller 233 determines from a value of the specific address of the communication buffer 234 if the access from the controller CPU 310 is allowed (step S609). In step S609, if the access by the controller CPU 310 is not allowed, the process returns to step S606. At that time, the controller CPU 310 waits until receiving a next interrupt signal.

In step S609, when the access from the controller CPU 310 is allowed, the converter 238 of the ASIC 230 converts the signal input to the interface controller 233 into the signal based on the standard determined between the ASIC 230 and the engine CPU 240, and outputs the converted signal to the CPU interface 236 (step S610).

Subsequently, the ASIC 230 performs processing corresponding to control from the controller CPU 310, based on the signal input from the interface controller 233 to the CPU interface 236, referring to the register 237 (step S611).

Thus, in the present embodiment, by using the communication buffer 234 that accepts access from both the controller CPU 310 and the engine CPU 240, both the controller CPU 310 and the engine CPU 240 can control the ASIC 230. In other words, the ASIC 230 includes the communication buffer 234 for receiving inputs of the first signal based on the first communication standard and the external second signal based on the second communication standard. Accordingly, the ASIC 230 can transfer the right of access between the engine CPU 240 and the controller CPU 310.

Next, with reference to FIG. 7, a description is given of operations of the ASIC 230 when conflicting access between the engine CPU 240 and the controller CPU 310 does occur.

FIG. 7 is a third flowchart illustrating operations of the image forming apparatus 100 according to the first embodiment.

The ASIC 230 sets priority in the setting register 253 of the CPU interface 236 (step S701). Specifically, in accordance with an instruction from the controller CPU 310 or the like, the CPU interface 236 sets the CPU whose access is prioritized in the priority setting register 254 of the setting register 253.

Subsequently, the ASIC 230 determines if the access from the controller CPU 310 conflicts with the access from the engine CPU 240 by the arbitration unit 251 of the CPU interface 236 (step S702).

Note that the access from the controller CPU 310 indicates that the signal, which is input from the controller CPU 310 and converted by the converter 238 of the interface controller 233, is input to the CPU interface 236.

In step S702, if the access conflicts, the process proceeds to step S706, to be described later.

In step S702, if the access does not conflict, the CPU interface 236 allows one of the controller CPU 310 and the engine CPU 240, which has accessed the ASIC 230, access by the arbitration unit 251 (step S703).

Subsequently, the CPU interface 236 determines an access destination module based on received address data by the access determination unit 252, and outputs a signal to the interface of the access destination module (step S704). Subsequently, the CPU interface 236 causes the access destination module to perform processing according to control (step S705). Specifically, the CPU interface 236 performs read/write processing on the access destination module.

In step S702, if the access conflicts, the CPU interface 236 determines if the engine CPU 240 is set in the priority setting register 254, by the arbitration unit 251 (step S706).

In step S706, if the engine CPU 240 is set in the priority setting register 254, the arbitration unit 251 allows the engine CPU 240 to access (step S707), and the process proceeds to step S704.

In step S706, when the engine CPU 240 is not set in the priority setting register 254, that is, when the controller CPU 310 is set in the priority setting register 254, the arbitration unit 251 allows the controller CPU 310 to access (step S708), and the process proceeds to step S704.

As described above, in the present embodiment, even when the communication buffer 234 is not used, the conflicting access from both the engine CPU 240 and the controller CPU 310 can be arbitrated.

Figure 8:
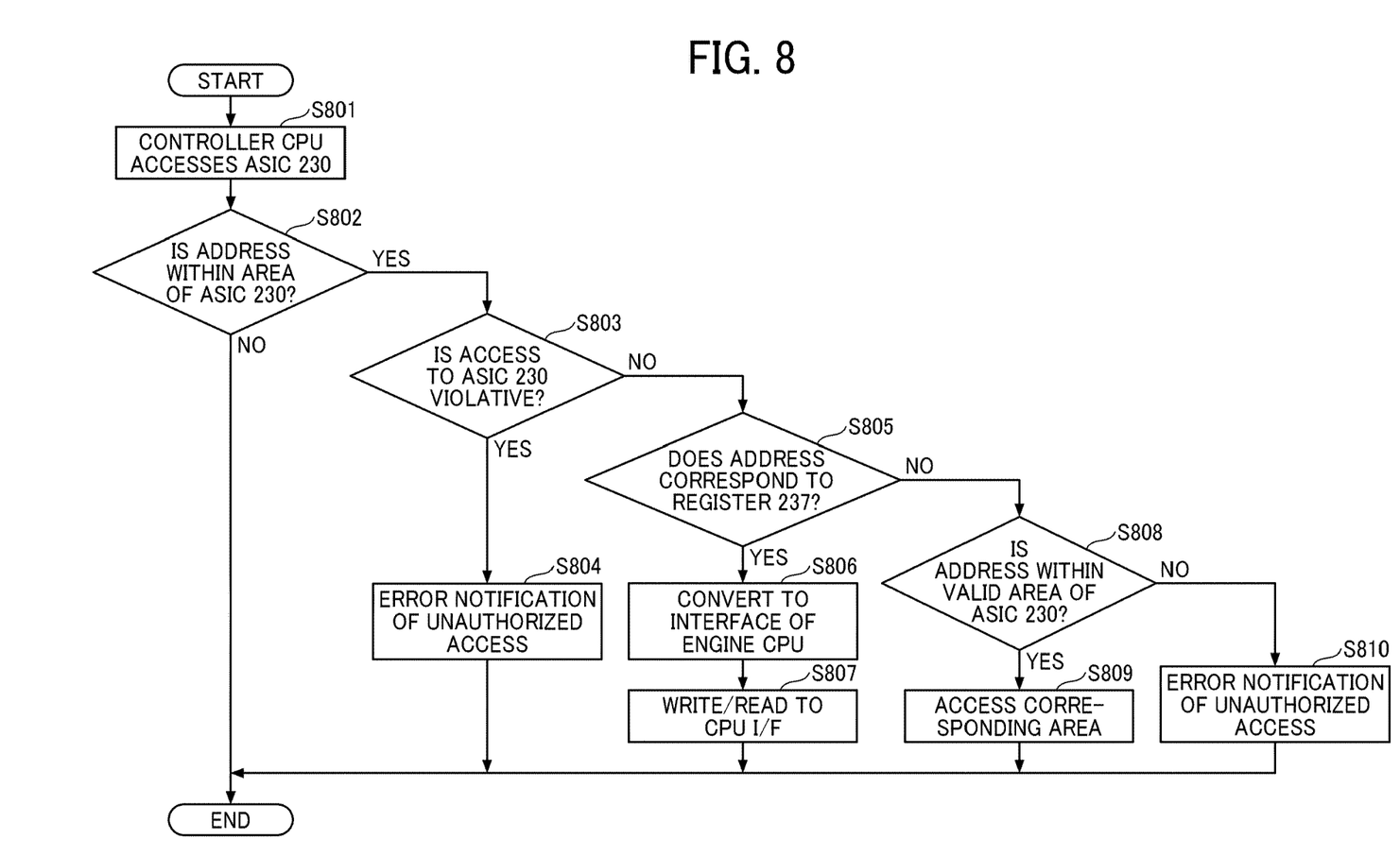
FIG. 8 is a fourth flowchart illustrating operations of the image forming apparatus according to the first embodiment.

Next, with reference to FIG. 8, a description is given of operations of the ASIC 230 when the controller CPU 310 accesses the ASIC 230.

FIG. 8 is a fourth flowchart illustrating the operations of the image forming apparatus 100 according to the first embodiment. In the ASIC 230 according to the present embodiment, the interface controller 233 accepts access from the controller CPU 310 (step S801).

Subsequently, the ASIC 230 determines if the accepted access is access to an address area of the ASIC 230, by the interface controller 233 (step S802).

In step S802, if the access is not access to the address area of the ASIC 230, that is, if the access is not to the ASIC 230, the process ends. In the case in which the access is not to the ASIC 230, for example, access is to another part on the PCIe bus or is invalid.

In step S802, if the access is to the address area of the ASIC 230, the ASIC 230 determines if the access is violative (step S803). Violative access refers, for example, to access to an area (invalid area) to which a module has not been assigned in the memory area of the ASIC 230, or access is not supported by the ASIC 230 (for example, byte access to a byte access prohibited area).

In the step S803, if the access is violative, the interface controller 233 notifies the controller CPU 310 of an error indicating an unauthorized access (step S804), and the process ends.

In step S803, if the ASIC 230 determines that the access is not violative, the ASIC 230 determines if the access corresponds to access to the register 237 by the interface controller 233 (step S805).

In step S805, if the access is not to the register 237, the process proceeds to step S808 to be described later.

In step S805, in the case of the access to the register 237, the interface controller 233 converts the input signal into the signal based on the standard determined between the ASIC 230 and the engine CPU 240 by the converter 238 (step S806).

Subsequently, the interface controller 233 outputs the converted signal to the CPU interface 236. The CPU interface 236 performs read/write processing to the register 237 (step S807), and the process ends.

In step S805, if the access is not to the register 237, the interface controller 233 determines if the access is to a valid area of the communication buffer 234 (step S808). More specifically, the interface controller 233 determines if the access is to the specific register of the communication buffer 234.

In step S808, in the case of the access to the valid area of the communication buffer 234, the interface controller 233 accesses and performs processing on the corresponding area (step S809) and the process ends.

In step S808, if the access is not to the valid area of the communication buffer 234, the interface controller 233 notifies the controller CPU 310 of an error indicating an unauthorized access (step S810) and the process ends.

As described above, in the present embodiment, the ASIC 230 can reliably determine if the access to the ASIC 230 is unauthorized.

The process illustrated in FIG. 8 may be performed, for example, in step S601 in FIG. 6. Further, the process illustrated in FIG. 8 may be performed as the processing from step S608 to step S611.

As described above, in the present embodiment, the ASIC 230 includes the converter 238 that converts a signal input via a bus into the signal based on the standard determined between the ASIC 230 and the CPU directly connected to the ASIC 230 and outputs the converted signal to the CPU interface 236. Therefore, according to the present embodiment, the CPU connected to the ASIC 230 via the bus can control the ASIC 230. Therefore, it is unnecessary to mount the ASIC 230 and the CPU to control the ASIC 230 on the same board, and the versatility of the ASIC 230 can be enhanced.

In the present embodiment, the ASIC 230 includes the arbitration unit 251 to arbitrate conflicting access among a plurality of CPUs. Therefore, according to the present embodiment, for example, even when a plurality of existing CPUs is connected to the ASIC 230, the plurality of CPUs can control the ASIC 230, and the versatility of the ASIC 230 can be enhanced.

Figure 9:
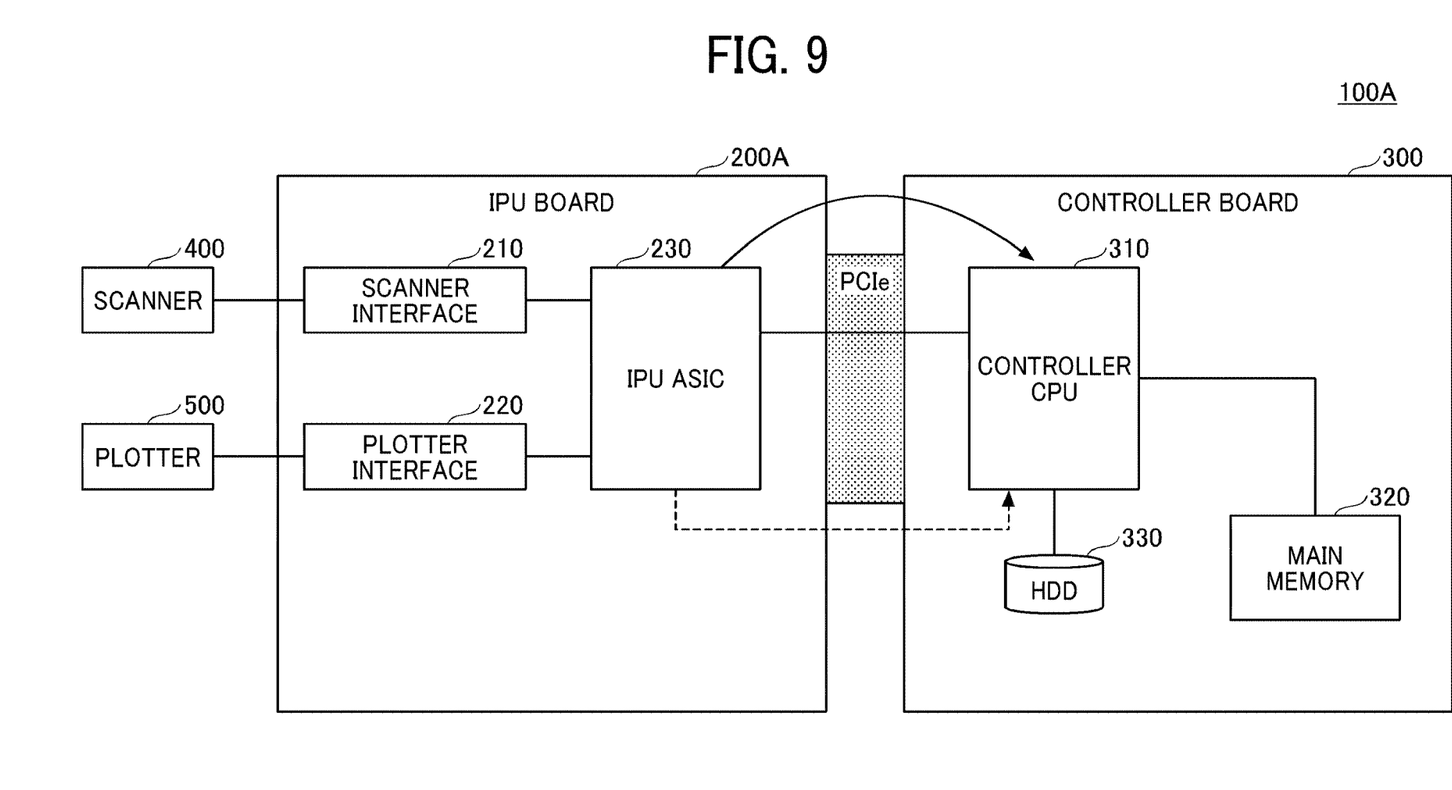
FIG. 9 is a block diagram illustrating an image forming apparatus according to a second embodiment of the present disclosure.

A description is given of a second embodiment of the present disclosure with reference to the drawings. FIG. 9 is a block diagram illustrating an image forming apparatus 100A according to the second embodiment.

The second embodiment differs from the first embodiment in that an image forming apparatus 100A does not have the engine CPU 240. Note that, in the following description of the second embodiment, only differences from the first embodiment are described. Elements that function similarly to the elements according to the first embodiment are given reference numerals similar to those in the first embodiment, and redundant descriptions are omitted.

The image forming apparatus 100A illustrated in FIG. 9 includes an IPU board 200A, the controller board 300, the scanner 400, and the plotter 500. The engine CPU 240 is not mounted on the IPU board 200A.

Since the image forming apparatus 100A does not include the engine CPU 240, it is unnecessary for the ASIC 230 to transfer the right of access among the plurality of CPUs using the communication buffer 234.

Specifically, in the example in FIG. 9, the controller CPU 310 does not need to access the specific register of the communication buffer 234 to transfer the right of access to and from the engine CPU 240. The process of accessing the communication buffer 234 is performed in a period when the scanner 400 does not read image data and the plotter 500 does not output image data. This period is, for example, a period during which a sensor disposed in a transport path of the scanner 400 or the plotter 500 does not detect passage of a recording medium.

In FIG. 9, the ASIC 230 of the present embodiment is mounted on the IPU board 200A on which the engine CPU 240 is not mounted. Therefore, there is no need to perform processing in a period (a paper interval) during which the passage of the recording medium is not detected, the processing is reduced.

In addition, if the ASIC 230 according to the present embodiment is applied, the controller CPU 310 can control the ASIC 230 on the IPU board 200A using a configuration in which only the controller CPU 310 is mounted like the image forming apparatus 100A. Therefore, the cost of the image forming apparatus 100A can be reduced.

Since the engine CPU 240 does not exist in the image forming apparatus 100A in FIG. 9, the interrupt signal to be handled by the engine CPU 240 is handled by the ASIC 230.

The ASIC 230 may output the interrupt signal to the controller CPU 310 in one of the following two methods.

The first method is a method of outputting the interrupt signal under control of the interrupt controller 235, similarly to the method in the case in which the engine CPU 240 is mounted.

The second method is a method of outputting an interrupt signal as a packet to the controller CPU 310 according to the PCI express standard. This method is a method known, for example, as virtualwire, message signaled interrupt (MSI).

When the second method is used, there is no need to connect the ASIC 230 and the controller CPU 310 via a signal line in the image forming apparatus 100A. Further, when the extended function of the MSI is used, reading of the interrupt factor register 255 becomes unnecessary.

As described above, in the example of FIG. 9, the handling of the interrupt signal can be selected according to specifications.

Figure 10:
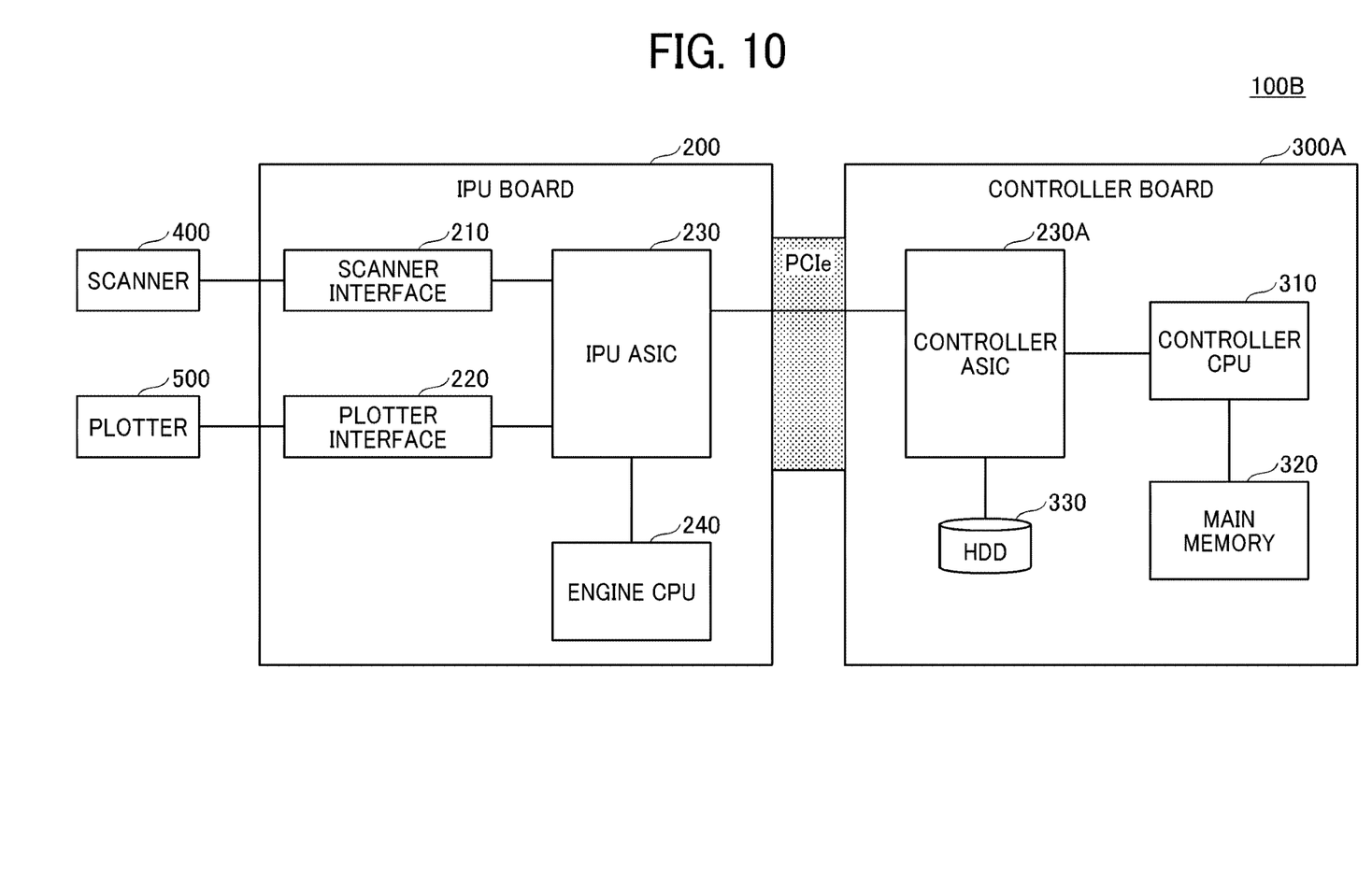
FIG. 10 is a block diagram illustrating an image forming apparatus according to a third embodiment of the present disclosure.

A description is now given of a third embodiment of the present disclosure with reference to the drawings. FIG. 10 is a block diagram illustrating an image forming apparatus 100B according to the third embodiment.

The third embodiment differs from the first embodiment in that the image forming apparatus 100B includes the controller ASIC 230A. Note that, in the following description of the third embodiment, only differences from the first embodiment are described. Elements that function similarly to the elements according to the first embodiment are given reference numerals similar to those in the first embodiment, and redundant descriptions are omitted.

The image forming apparatus 100B illustrated in FIG. 10 includes the IPU board 200, a controller board 300A, the scanner 400, and the plotter 500. The controller board 300A includes a controller ASIC 230A that is directly connected to the controller CPU 310 and controlled by the controller CPU 310.

With this configuration in FIG. 10, each of the IPU board 200 and the controller board 300A includes an ASIC and a CPU, enabling high-speed image processing and image transfer.

Thus, according to the ASIC 230 of the above-described embodiments, image forming apparatuses having configurations as illustrated in FIGS. 1, 9, and 10 are realizable.

The image forming apparatus 100 in FIG. 1 has the configuration including the ASIC 230, the engine CPU 240 directly connected to the ASIC 230, and the controller CPU 310 connected to the ASIC 230 via the PCIe bus. The image forming apparatus 100A in FIG. 9 has the configuration including the ASIC 230 and the controller CPU 310 connected to the ASIC 230 via the PCIe bus. The image forming apparatus 100B in FIG. 10 has the configuration including the ASIC 230, the engine CPU 240 directly connected to the ASIC 230, the controller ASIC 230A connected to the ASIC 230 via the PCIe bus, and the controller CPU 310 directly connected to the controller ASIC 230A.

As above-described embodiments, an image forming apparatus having a configuration conforming to the required specification, while using the existing engine CPU 240 and the controller CPU 310, can be provided.

More specifically, in a low-end image forming apparatus that is relatively inexpensive and does not require high performance, with the configuration illustrated in FIG. 9, the number of components of hardware can be reduced and the cost can be reduced, while real-time capability is secured to satisfy the required performance. Further, in the case of a high-end image forming apparatus requiring high performance, high image quality can be realized with the configuration in FIG. 10. Furthermore, in the present embodiment, since the ASIC 230 mounted on a high-end model can be used for a low-end model, the quality of image processing in the low-end model can be made equivalent to that of the high-end model.

Further, according to the above-described embodiments, the ASIC 230 can be used from the low-end model to the high-end model as described above, and the versatility of the ASIC 230 can be improved.

In the above-described embodiment, the ASIC 230 is mounted on the image forming apparatus, but the present disclosure is not limited thereto. The ASIC 230 may be employed in devices other than the image forming apparatus. Specifically, the ASIC 230 may be mounted on, for example, an image projection device that projects an image based on image data, a display device that displays an image based on image data, or the like.

The above-described embodiments are illustrative and do not limit the present disclosure. Thus, numerous additional modifications and variations are possible in light of the above teachings. It is therefore to be understood that within the scope of the present disclosure, the present disclosure may be practiced otherwise than as specifically described herein. The number, position, and shape of the components described above are not limited to those of embodiments described above. Desirable number, position, and shape can be determined to perform the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. Control circuitry incorporated into an image forming apparatus comprising:
   an interface controller configured to receive a first signal, the interface controller including a converter configured to convert the first signal based on a first communication standard into an internal second signal based on a second communication standard and output the internal second signal;
   a central processing unit (CPU) interface including an arbitration unit, the CPU interface being configured to receive the internal second signal from the converter and an external second signal from outside the control circuitry, the external second signal being based on the second communication standard, the arbitration unit being configured to arbitrate between access of the internal second signal and access of the external second signal;
   a communication buffer configured to receive an input of the first signal and an input of the external second signal; and
   an interrupt controller configured to:
     output an interrupt signal in response to the input of the first signal to the communication buffer, to a second CPU configured to output the external second signal; and
     output an interrupt signal in response to the input of the external second signal to the communication buffer, to a first CPU configured to output the first signal.

2. The control circuitry according to claim 1, further comprising a setting register, in which an arbitration rule of the arbitration unit is set, included in the CPU interface.

3. The control circuitry according to claim 2,
wherein priority between the access of the internal second signal output from the converter and the access of the external second signal input from outside the control circuitry is set in the setting register.

4. The control circuitry according to claim 1, further comprising a register configured to be read and written by the CPU interface,
wherein the CPU interface is configured to receive an input of a signal in response to the interrupt signal from the second CPU and determine if access of the second CPU is allowable,
wherein the CPU interface is configured to read from and write to the register according to the signal input from the second CPU when the access of the second CPU is allowable,
wherein the interface controller is configured to receive an input of a signal in response to the interrupt signal from the first CPU and determine if access of the first CPU is allowable, and
wherein the converter is configured to convert the first signal input from the first CPU into the internal second signal and output the internal second signal to the CPU interface when the access of the first CPU is allowable.

5. The control circuitry according to claim 1,
wherein the interface controller determines if the first signal is an unauthorized input and notifies the first CPU of an error in case of the unauthorized input.

6. The control circuitry according to claim 1,
wherein the first communication standard is a peripheral component interconnect (PCI) express standard, and
wherein the interrupt controller is configured to output the interrupt signal to the first CPU as a packet based on the first communication standard.

7. The control circuitry according to claim 1,
wherein the interface controller is configured to determine if the second CPU is connected to the CPU interface in response to the input of the first signal.

8. The control circuitry according to claim 1, further comprising:
a scanner image processor configured to perform image processing on image data read by a scanner; and
a plotter image processor configured to perform image processing on image data output from a plotter.

9. An image forming apparatus comprising:
the control circuitry according to claim 8;
the scanner configured to read an image and create the image data; and
the plotter configured to form an image on a recording medium based on the image data.

10. A control method to be executed by control circuitry including a converter, an arbitration unit, a communication buffer, and an interrupt controller, the method comprising:
converting, by the converter, a first signal based on a first communication standard into an internal second signal based on a second communication standard and outputting the internal second signal;
arbitrating, by the arbitration unit, between access of the internal second signal converted from the first signal and access of an external second signal, which is also based on the second communication standard, input from outside the control circuitry;
in response that the first signal being input to the communication buffer; outputting, by the interrupt controller, an interrupt signal to a second central processing unit (CPU) configured to output the external second signal; and
in response that the external second signal being input to the communication buffer, outputting, by the interrupt controller, an interrupt signal to a first CPU configured to output the first signal.

* * * * *